United States Patent [19]

Hoffman

[11] Patent Number: 4,520,325
[45] Date of Patent: May 28, 1985

[54] PHASE SHIFTERS

[75] Inventor: Gilbert A. Hoffman, Aloha, Oreg.

[73] Assignee: Tektronix, Inc., Beaverton, Oreg.

[21] Appl. No.: 596,793

[22] Filed: Apr. 4, 1984

[51] Int. Cl.³ .................. G01R 27/26; H03F 3/191
[52] U.S. Cl. .................................. 330/302; 324/61 P
[58] Field of Search ............... 330/302; 333/138, 139, 333/140; 343/440, 441, 442, 431; 324/83 R, 61 P

[56] References Cited

U.S. PATENT DOCUMENTS 3,264,554   8/1966   Hayner et al. .................. 324/61 P Primary Examiner—James B. Mullins
Assistant Examiner—Steven J. Mottola
Attorney, Agent, or Firm—John Smith-Hill

[57] ABSTRACT

A capacitive goniometer comprises a plurality of like conductive annular sectors supported in mutually substantially coplanar relationship so as to define an axis which extends through the center of the annulus and is substantially perpendicular to the common plan of the sectors. A conductive member having a generally arc rate outer periphery is supported in spaced confronting relationship with the sectors with the outer periphery of the conductive member not extending substantially farther radially of the axis than the sectors, whereby an electrical signal applied to one of the sectors is capacitivity coupled to the conductive member.

9 Claims, 4 Drawing Figures

PHASE SHIFTERS

This invention relates to phase shifters.

BACKGROUND OF THE INVENTION

It is known to use a goniometer to generate, from a constant frequency sinusoidal input signal, a sinusoidal output signal having the same frequency as the input signal but with its phase shifted by a controlled amount with respect to the input signal.

There are two principal types of goniometer, one of which is the capacitive goniometer. One form of capacitive goniometer is disclosed in U.S. Pat. No. 3,264,554 of Hayner et al. In that goniometer, a stator carries four mutually insulated quadrant plates which are supplied with a sinusoidal reference signal, and the connections to the quadrant plates are phased 90 deg. apart. Surrounding the four quadrant plates, and insulated therefrom, is an annular output plate. A rotor which carries a cardioid plate is mounted to rotate about an axis entending through the center of the stator. The cardioid plate is arranged in confronting relationship with the quadrant plates. Surrounding the cardioid plate is a conductive ring which is in confronting relationship with the output ring.

The configuration of the cardioid plate is such that, for any given angular position of the rotor, the cardioid plate is capacitively coupled to at least one of the four quadrant plates. The signals that are coupled to the cardioid plate are additively combined in the cardioid plate and are capacitively coupled to the output ring to provide an output signal which is of the same frequency as the reference signal and has a phase which is dependent on the angular position of the rotor.

The goniometer described in U.S. Pat. No. 3,264,554 is a bulky device, being constructed as the readout device for a magnetic compass. This being so, the rotor and stator are quite large. In addition, an oil dielectric is present between the rotor and the stator. Accordingly, the capacitances of the capacitors are quite large and therefore interference between the reference signal and the output signal does not present a problem. Moreover, the stray capacitance between the quadrant plates and the annular output plate, which depends on the radius of curvature of the quadrant plates, is not substantial in relation to the capacitances of the capacitors and therefore its effect does not reduce substantially the amplitude of the output signal. The goniometer disclosed in U.S. Pat. No. 3,264,554 is not suitable for use in a portable TV vectorscope, to change the phase of the demodulator reference signal, and thereby rotate the vector display, because of its large size. It could not be simply scaled down in size because the reduced distances between components would give rise to excessive interference between the reference signal and the output signal.

SUMMARY OF THE INVENTION

According to the present invention there is provided a capacitive goniometer which comprises (A) a plurality of like conductive annular sectors; (B) first means supporting said sectors in substantially coplanar relationship, whereby said sectors define an axis which extends through the center of the annulus and is substantially perpendicular to the common plane of the sectors; (C) a conductive member having a generally arcuate other periphery; (D) second means supporting said conductive member in spaced confronting relationship with said sectors with the outer periphery of the conductive member not extending substantially farther radially of said axis than the sectors, whereby an electrical signal applied to one of said sectors is capactively coupled to said conductive member, said second means permitting relative angular movement of said conductive member and said first means about said axis; and (E) output means coupled to said conductive member for making said electrical signal available.

BRIEF DESCRIPTION OF THE DRAWINGS

For a better understanding of the invention, and to show how the same may be carried into effect, reference will know be made, by way of example, to the accompanying drawings in which.

DETAILED DESCRIPTION

Figure 1:
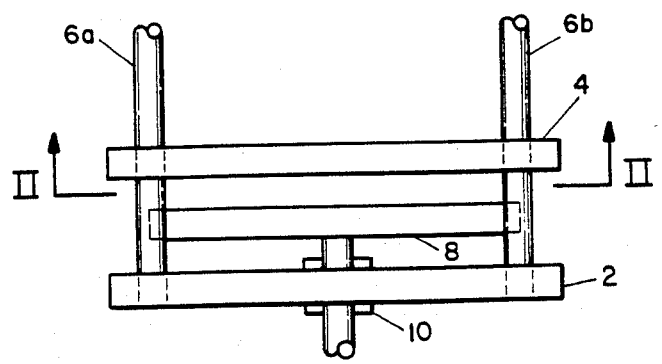
FIG. 1 is a side elevation of a capactive goniometer embodying the present invention.
Figure 2:
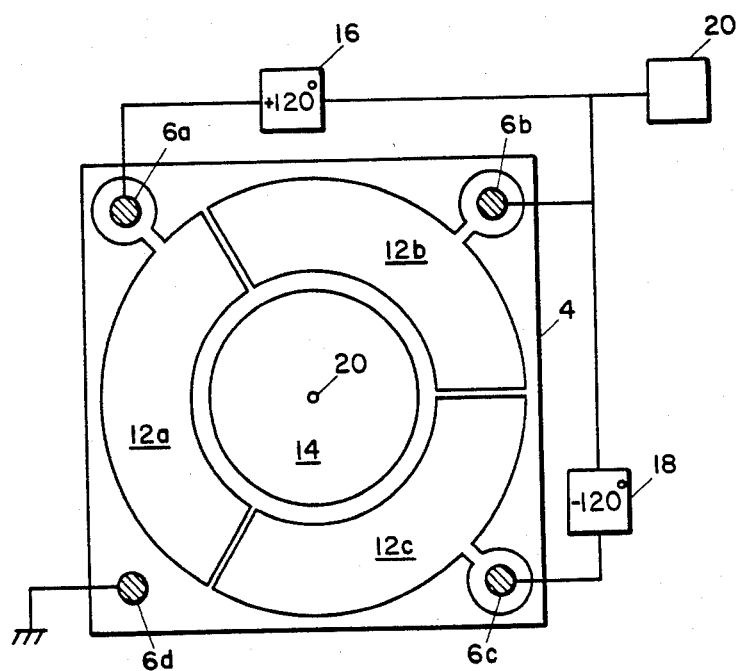
FIG. 2 is a view taken along the line II—II of FIG. 1.

The goniometer illustrated in the drawings is designed for use in a compact TV vectorscope for changing the phase of the demodulator reference signal. The demodulator reference signal is a continuous wave sinusoidal signal having a frequency of 3.58 MHz or 4.43 MHz, depending on the television system involved. The reference signal is received from a signal generator which is phase locked to subcarrier burst of the signal under examination, and the phase-shifted signal is fed to the demodulator for rotating the vector display.

The goniometer comprises a two plates 2 and 4 of dielectric material supported in spaced parallel relationship by four posts 6a, 6b, 6c and 6d. The plate 4 is made of dielectric material and constitutes a stator, and a circular rotor 8 of dielectric material is disposed between the plates 2 and 4. The rotor 8 is mounted in a bearing 10, which may be of conventional form, to rotate about its central axis. The stator and rotor have flat confronting faces. On these confronting faces, the stator is provided with a conductive pattern comprising three annular sectors 12a, 12b and 12c and a central disc 14, and the rotor is provided with a conductive generally cardioid pattern 16. The term "annular sector", as used herein, is intended to mean a sector of an annulus, i.e., a portion of an annulus defined by two lines that extend radially of the annulus. The three annular sectors 12a, 12b and 12c are connected to the posts 6a, 6b and 6c respectively, and these posts are in turn connected to the reference signal source 20, the post 6b being connected directly to the signal source and the posts 6a and 6c being connected through unity gain phase shifting networks 16 and 18. The network 16 is a plus 120 deg. phase shifter while the network 18 is a minus 120 deg. phase shifter. Thus, the reference signals applied to the three sectors are shifted apart from each other in phase by 120 deg.

Figure 3:
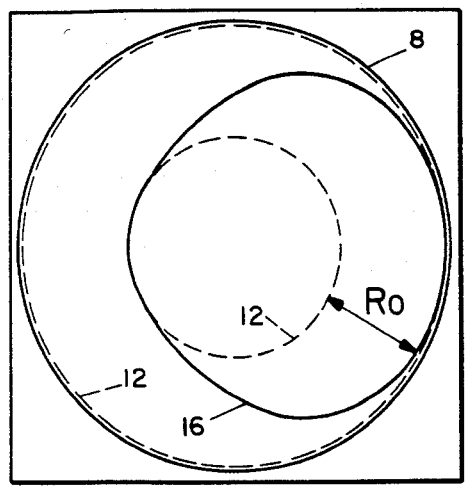
FIG. 3 is a view taken in the opposite direction to FIG. 2.
Figure 4:
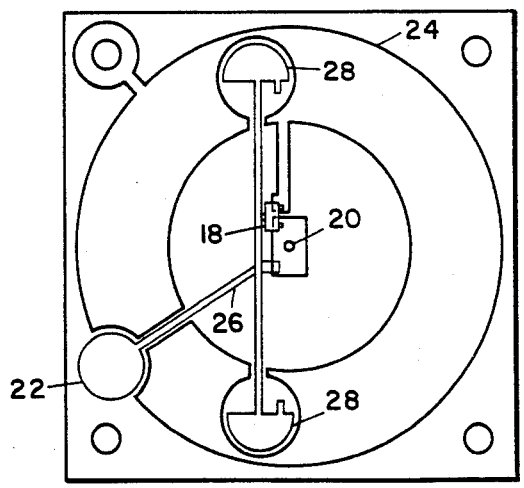
FIG. 4 is a top plan of the goniometer shown in FIG. 1.

The location of the annulus 12 relative to the cardioid pattern 16 is shown in dashed lines in FIG. 3, and it will be appreciated that the cardioid pattern is capacitively coupled to the annulus 12 across the air gap between the rotor and the stator. Therefore, the cardioid member serves to combine in additive fashion the potentials impressed on the three annular sectors, with weighting factors dependent upon the shape and angular position of the cardioid pattern, and a potential is developed on the cardioid pattern that varies in time at the same frequency as the reference signal, but the phase of which depends on the angular position of the rotor relative to the stator. The cardioid pattern is also capacitively coupled to the disc 14, and therefore a potential is developed on the central disc that depends upon the potential developed on the cardioid pattern. Thus, the potential developed on the central disc 14 is a potential that varies in sinusoidal manner at the same freqency as the reference signal but has a phase which depends upon the angular position of the cardioid pattern.

In order to produce the strongest possible output signal, the area of each of the annular sectors and of the central disc must be as large as possible. This implies that the sectors and the disc must each be of equal area. If the radius of the disc is R and the longer radius of the annulus is R+A, and the difference between the radius of the disc and the shorter radius of the annulus is negligible, the area of each sector is equal to the area of the disc if R is equal to A.

In a goniometer constructed in accordance with the teaching of U.S. Pat. No. 3,264,554 but having the stator plate in three sectors instead of four, the area of each sector is equal to the area of the output annulus if R is equal to 6.46A. For a given value of R+A the length of the inner periphery of the annulus is smaller in the case of the illustrated goniometer than in the case of the teaching of U.S. Pat. No. 3,264,554, and therefore the stray capacitance between the sectors and the output plate, and crosstalk between the output plate and the sectors, is less in the case of the illustrated goniometer than in the case of the teaching of U.S. Pat. No. 3,264,554.

The illustrated goniometer is small in size (the external diameter of the annulus is about 2.2 cm) and there is no dielectric other than air between the rotor and the stator. The capacitance of each of the four capacitors present in the goniometer is about 0.5 pF. The output signal produced on the disc 14 must be amplified before it is applied to the demodulator. It is desirable that the signal produced by the goniometer be fed to the demodulator using a coaxial cable in order to avoid excessive degradation of the signal. In the aforementioned vectorscope it proved necessary to use a cable about 18 cm long. The capacitance to ground between the central conductor of a coaxial cable about 18 cm long and the shield conductor of the cable is about 18 pF. Therefore, if the amplifier is positioned at the output end of the coaxial cable the stray capacitance to ground of the cable itself will absorb changes in potential of the central disc and make detection of the signal very difficult. Therefore, an amplifier, constituted by a single transistor 18, is mounted at the input end of the coaxial cable, on the opposite side of the stator board 4 from the central disc 14. The base of the transistor 18 is connected to the disc 14 by metallization through a central hole 20 in the stator, and its emitter is connected to ground, as will be described in further detail hereafter. The collector of the transistor is connected to a circular output connection pad 22. This also ensures that the effect of crosstalk between the base of the transistor and the three sectors is minimized, because the connection between the disc 14 and the transistor is equidistant from the three sectors. In the case of U.S. Pat. No. 3,264,554, the connection to the annulus is necessarily closer to one or two of the quadrant plates than to the other quadrant plates, and therefore crosstalk between the connection to the annulus and the quadrant plates is not self-cancelling.

In order to reduce still further the possibility of crosstalk between the sectors 12 and the base of the transistor, the back of the stator plate 4 is metallized in a generally annular pattern 24 corresponding to the three sectors, and this annular metallization pattern is grounded through the post 6d. The pattern 24 is also connected to the emitter of the transistor 18, thus grounding the emitter.

For the reason previously mentioned, the transistor is located as close as possible to the connection to the central disc. Accordingly, the transistor is located close to the center of the back of the stator plate. The central conductor of the coaxial cable is connected to the collector of the transistor, and the connection is made by way of the pad 22, which is located close to the periphery of the board. The connection pad 22 is connected to the collector of the transistor through a strip-form conductor 26. It will be appreciated that this results in capacitive coupling between the collector of the transistor and the sector 12a, which is on the other side of the plate 4, immediately behind the pad 22. In order to compensate for this effect, the collector is also coupled capacitively to the other two sectors 12b and 12c through umbrella-like metallization areas 28, which have the same area as the portion of the pad 22 and conductor 26 which is capacitively coupled to the first sector 12a.

The plate 4 is made of conventional epoxy circuit board material, and the metallization is provided on the plate 4 using conventional photo-etching techniques. The rotor 8 is made of synthetic plastic and the cardioid pattern 16 is formed using polymer thick film material, applied in conventional manner. The cardioid pattern is developed by wrapping a sine squared function around a disc. This, the perimeter of the pattern is described in polar coordinates (r, θ) by the equation $$r = r_o + a \sin^2(\theta/2)$$

where $r_o$ is the radius of the disc and a is a constant. The radius $r_o$ is substantially equal to the shorter radius of the annulus 12, and a is substantially equal to the difference between the shorter and longer radii of the annulus 12.

It will be appreciated by those skilled in the art that the invention is not restricted to the particular goniometer which has been described and illustrated, since variations may be made therein without departing from the scope of the invention as defined in the appended claims, and equivalents thereof. For example, as suggested by the disclosure of U.S. Pat. No. 3,264,554, the invention is not restricted to use of three annular sectors. Four sectors, or more, may be used, provided that the sectors subtend substantially equal angles at the center of the annulus and the phase shift between the reference signal fed to adjacent sectors corresponds to the angle that is subtended by the sectors at the center. The use of the umbrella-shaped metallization areas is not essential to the invention, and is used only because the connection to the collector of the transistor is made close to the edge of the plate. If the connection were made without substantial capacitive coupling to one of the sectors, it would not be necessary to provide compensatory coupling to the other sectors. Also, other shapes of the cardioid pattern are possible than that defined by the equation above, so long as the angular extent of the portion of the pattern coupled to the annulus 12 is sufficient to couple the pattern to the annulus over at least two sectors thereof, and the radial extent of the portion of the pattern that is coupled to the annulus 12 increases smoothly from zero at one limit of the angular extent of the pattern, attains a maximum value at about the middle point of the angular extent, and decreases smoothly from the maximum value to zero at the other limit of the angular extent of the pattern. These general requirements for the pattern, applied to the specific shape shown in FIG. 3, can readily be seen in FIG. 3, where the pattern overlaps at least part of the annulus around substantially its entire angular extent and the radial extent $R_o$ varies in the manner described. Furthermore, it is not essential that the conductive pattern 16 be capacitively coupled through the disk 14 to the base of the transistor, since a direct contact via, e.g., a conductive stud may be employed.

I claim:

1. A capacitive goniometer which comprises:
   (A) a plurality of like conductive annular sectors;
   (B) first means supporting said sectors in mutually substantially coplanar relationship, whereby said sectors define an axis which extends through the center of the annulus and is substantially perpendicular to the common plane of the sectors;
   (C) a conductive member having a generally arcuate outer periphery;
   (D) second means supporting said conductive member in spaced confronting relationship with said sectors with the outer periphery of the conductive member not extending substantially farther radially of said axis than the sectors, whereby an electrical signal applied to one of said sectors is capacitively coupled to said conductive member, said second means permitting relative angular movement of said conductive member and said first means about said axis; and
   (E) output means coupled to said conductive member for making said electrical signal available.

2. A goniometer according to claim 1, wherein said output means comprise a circular conductive disk supported by said first means in substantially coplanar and concentric relationship with said annular sectors, and wherein said conductive member is configured to be in spaced confronting relationship with said disk, whereby said electrical signal is capacitively coupled from said conductive member to said disk.

3. A goniometer according to claim 2, comprising an amplifier device connected to said disk.

4. A goniometer according to claim 3, wherein said first means comprise a plate of dielectric material and said sectors and said disk are layers of conductive material deposited on one main face of said plate, and the amplifier device comprises a transistor supported on the plate at the opposite main face thereof and having its base electrode connected to said disk.

5. A goniometer according to claim 4, wherein the plate is formed with an aperture positioned at substantially the center of the disk and electrically conductive material is present within said aperture and connects said disk electrically to the base electrode of said transistor.

6. A capacitor goniometer which comprises:
   (A) a plate of dielectric material having first and second main faces;
   (B) a plurality of like conductive sectors supported by said plate at said first main face thereof in mutually substantially coplanar relationship, said sectors each being of generally annular form and curved about a common center of curvature whereby said sectors define an axis which extends through said common center of curvature and is substantially perpendicular to the common plane of the sectors;
   (C) a conductive member having a generally arcuate outer periphery;
   (D) means supporting said conductive member in spaced confronting relationship with said sectors with the outer periphery of the conductive member not extending substantially farther radially of said axis than the sectors, whereby an electrical signal applied to one of said sectors is capacitively coupled to said conductive member, said means permitting relative angular movement of said conductive member and said plate about said axis; and
   (E) an amplifier device supported on the plate at the second main face thereof and having an input terminal coupled to said conductive member.

7. A goniometer according to claim 6, comprising a second conductive member supported by said plate in substantially coplanar relationship with said sectors and in spaced confronting relationship with the first-mentioned conductive member, whereby said electrical signal is capacitively coupled from said first-mentioned conductive member to said second conductive member, the input terminal of the amplifier device being connected to said second conductive member.

8. A goniometer according to claim 7, wherein said second conductive member is rotationally symmetrical about said common center of curvature.

9. A goniometer according to claim 7, wherein the plate is formed with an aperture and electrically conductive material is present within said aperture and connects said second conductive member electrically to said input terminal of the amplifier device.

* * * * *